United States Patent
Zhang et al.

(10) Patent No.: US 7,747,533 B2
(45) Date of Patent: Jun. 29, 2010

(54) DIGITAL APPLICATION OPERATING ACCORDING TO AGGREGATION OF PLURALITY OF LICENSES

(75) Inventors: Ning Zhang, Redmond, WA (US); Richard S. Eizenhoefer, Redmond, WA (US); Wen-Pin Scott Hsu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 11/259,677

(22) Filed: Oct. 26, 2005

(65) Prior Publication Data

US 2007/0016532 A1 Jan. 18, 2007

Related U.S. Application Data

(60) Provisional application No. 60/699,143, filed on Jul. 14, 2005.

(51) Int. Cl.
*G06F 21/00* (2006.01)
(52) U.S. Cl. .............................. 705/59; 705/54; 726/26
(58) Field of Classification Search .................... 705/59
See application file for complete search history.

(56) References Cited

U.S. PATENT DOCUMENTS

| | | | |
|---|---|---|---|
| 5,287,408 A * | 2/1994 | Samson | 705/59 |
| 6,636,858 B1 * | 10/2003 | Coffey et al. | 707/100 |
| 6,775,655 B1 | 8/2004 | Peinado et al. | 705/59 |
| 6,810,389 B1 * | 10/2004 | Meyer | 705/59 |
| 2002/0019814 A1 | 2/2002 | Ganesan | 705/59 |
| 2002/0198846 A1 * | 12/2002 | Lao | 705/54 |
| 2003/0097655 A1 * | 5/2003 | Novak | 725/31 |
| 2003/0204723 A1 | 10/2003 | Narin et al. | 713/165 |
| 2004/0039916 A1 * | 2/2004 | Aldis et al. | 713/177 |
| 2005/0044016 A1 | 2/2005 | Irwin et al. | 705/30 |
| 2005/0138357 A1 * | 6/2005 | Swenson et al. | 713/155 |

\* cited by examiner

*Primary Examiner*—Andrew J. Fischer
*Assistant Examiner*—Chrystina Zelaskiewicz
(74) *Attorney, Agent, or Firm*—Woodcock Washburn LLP

(57) ABSTRACT

A plurality of digital licenses correspond to a piece of content, including a base license and at least one add-on license. Each add-on license includes a reference to the base license, and each of the base license and each add-on license sets forth rules specifying how the content may be employed. Each add-on license is identified by way of the reference therein to the base license, and the rules in the base license and in each identified add-on license are aggregated into an aggregated set of rules that is evaluated to determine if such aggregated set of rules allows employing the content in a particular manner.

16 Claims, 5 Drawing Sheets

DIGITAL APPLICATION OPERATING ACCORDING TO AGGREGATION OF PLURALITY OF LICENSES

CROSS REFERENCE TO RELATED APPLICATION

This application claims the benefit of U.S. Provisional Application No. 60/699,143, filed Jul. 14, 2005 and entitled "HIERARCHY AND EVALUATION OF ADD-ON LICENSES", hereby incorporated by reference in its entirety.

TECHNICAL FIELD

The present invention relates to a digital application or the like operating on a computing device or the like according to rights and conditions set forth in a digital license or the like. More particularly, the invention relates to a plurality of such licenses that have been aggregated to in effect form a superset of rules and rights according to which the application operates.

BACKGROUND OF THE INVENTION

Rights management and enforcement is highly desirable in connection with digital content such as a digital application or the like, where such digital application is to be distributed to one or more users. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user on a computing device thereof, such user can activate the application with the aid of an appropriate operating system on the computing device.

Typically, an author and/or publisher of the application wishes to distribute such application to each of many users or recipients in exchange for a license fee or some other consideration. In such scenario, then, the application may be a word processing application, a spreadsheet application, a browser application, a gaming application, a media player application, a combination thereof, and the like. Such author/publisher or other similar entity (hereinafter, "publisher"), given the choice, would likely wish to restrict what each user can do with such published application. For example, the publisher would like to restrict the user from copying and re-distributing such application to a second user, at least in a manner that denies the publisher a license fee from such second user.

However, after publication has occurred, such publisher has very little if any real control over the application. This is especially problematic in view of the fact that practically every personal computer includes the software and hardware necessary to make an exact digital copy of such application, and to download such exact digital copy to a write-able magnetic or optical disk, or to send such exact digital copy over a network such as the Internet to any destination.

Of course, as part of a transaction wherein the application is distributed, the publisher may require the user/recipient of the application to promise not to re-distribute such application in an unwelcome manner. However, such a promise is easily made and easily broken. A publisher may attempt to prevent such re-distribution through any of several known security devices, usually involving encryption and decryption. However, there is likely very little that prevents a mildly determined user from decrypting an encrypted application, saving such application in an un-encrypted form, and then re-distributing same.

Rights Management (RM) and enforcement architectures and methods have previously been provided to allow the controlled operation of arbitrary forms of digital applications, where such control is flexible and definable by the publisher of such application. Typically, a digital license is provided to operate the application, where the application cannot be actuated in a meaningful manner without such license. For example, it may be the case that at least a portion of the application is encrypted and the license includes a decryption key for decrypting such encrypted portion. In addition, it may be the case that the license is tied to a user or a computing device thereof, and such computing device includes a security feature that ensures that the terms of the license are honored.

Such a digital license typically includes a set of rights and conditions that govern use of the corresponding application on the computing device. Thus, each license sets forth policies that grant certain rights for specified functionality. With digital licenses, then, a publisher can provide a user with different rights with regard to an application by providing different licenses corresponding to such different rights. For example, the publisher may wish to provide a full-featured edition of the application at a higher price and a rudimentary edition at a lower price. Likewise, the publisher may wish to offer an edition with a certain first feature and an edition without, an edition with a certain second feature and an edition without, an edition with a certain third feature and an edition without, etc.

Note, though, that in the prior art, because each variation of rights in an application would require a completely separate license, offering arbitrary combinations of rights to users was a difficult matter inasmuch as the number of arbitrary combinations of such rights could easily number in the tens, hundreds, and thousands, and each arbitrary combination of rights would require a separate type of license. For example, a publisher wishing to offer an application with five two-state rights (rights that are either present or absent, e.g.), would have to prepare 2 to the $5^{th}$ power or 32 different types of licenses. Likewise, a publisher wishing to offer an application with four two-state rights and two three-state rights (rights that are present, limited, or absent, e.g.), would have to prepare 2 to the $4^{th}$ power times 3 to the $2^{nd}$ power or 144 different types of licenses.

As should be appreciated, then, greater complexities of variations of an application would result in greater numbers of different types of licenses. However, and significantly, it is likely difficult if not impossible for a publisher of such an application to offer more than a limited number of types of such licenses, perhaps on the order of ten to thirty or so. Quite simply, to offer each type of license would require the publisher to maintain each type, including updating and modifying same as necessary, and such maintenance can easily become an overwhelming task as the number of types increases.

Accordingly, a need exists for a method and mechanism by which a publisher or the like of an application or the like can offer by way of a digital licensing scheme arbitrary combinations of rights to users or the like, where the number of different types of licenses representing such rights is minimized. In particular, a need exists for such a method and mechanism by which particular rights or groups of rights with regard to the application are represented by separate digital licenses for the application, and a user obtains one or more of such licenses to correspondingly obtain the rights or groups of rights collectively represented thereby. As a result, the number of different types of licenses for the application is minimized.

SUMMARY OF THE INVENTION

The aforementioned needs are satisfied at least in part by the present invention in which a method is provided to employ a piece of digital content on a computing device in a particular manner. In the method, a plurality of digital licenses corresponding to the content are obtained, where the plurality of licenses includes a base license and at least one add-on license. Each add-on license includes therein a reference to the base license, and each of the base license and each add-on license sets forth rules specifying how the content may be employed.

The base license is identified and each add-on license is identified by way of the reference therein to the base license, and the rules in the base license and in each identified add-on license are aggregated into an aggregated set of rules. The aggregated set of rules is then evaluated to determine if such aggregated set of rules allows employing the content in the particular manner, and the content is employed if the aggregated set of rules so allows.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
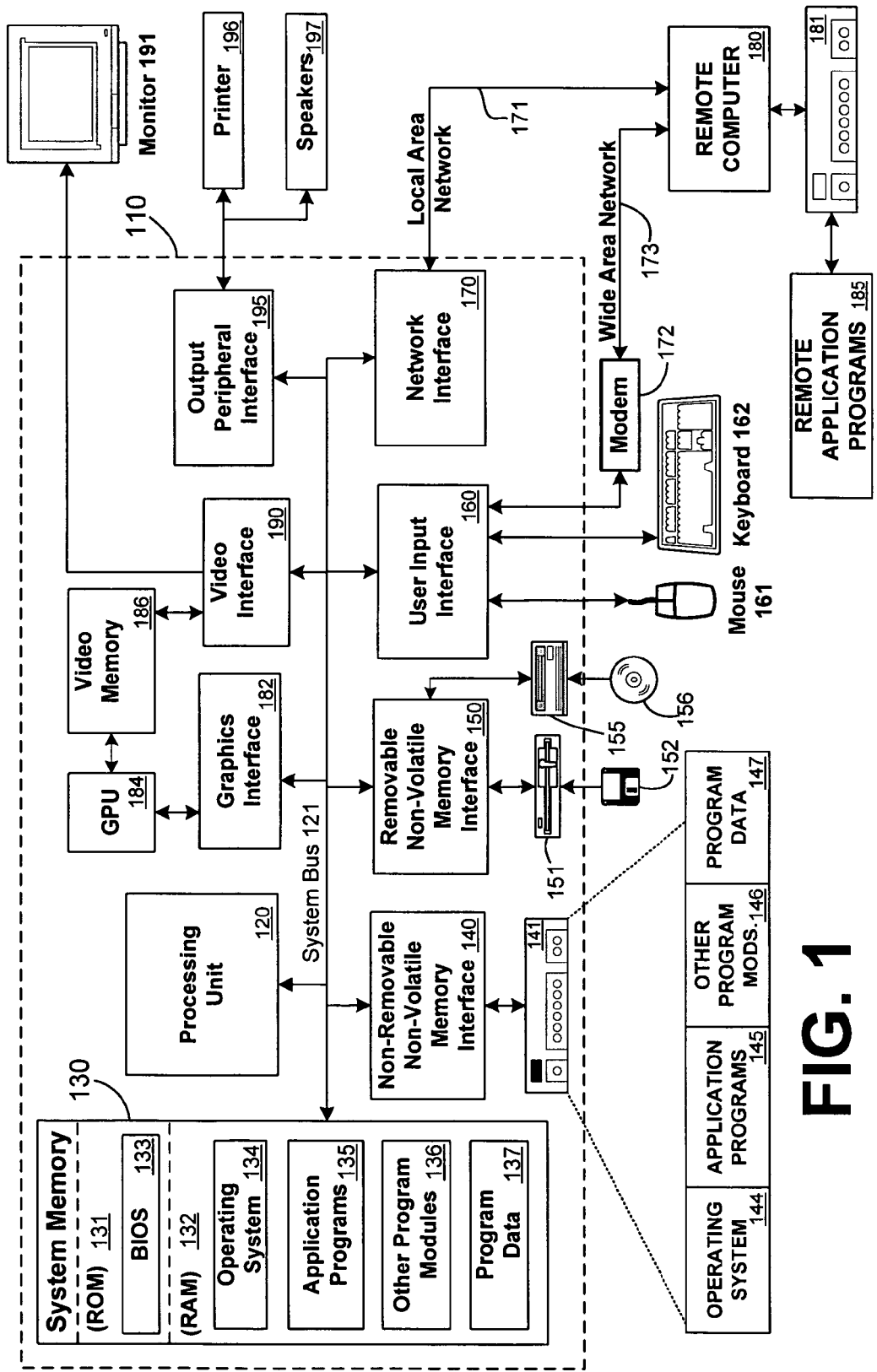
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
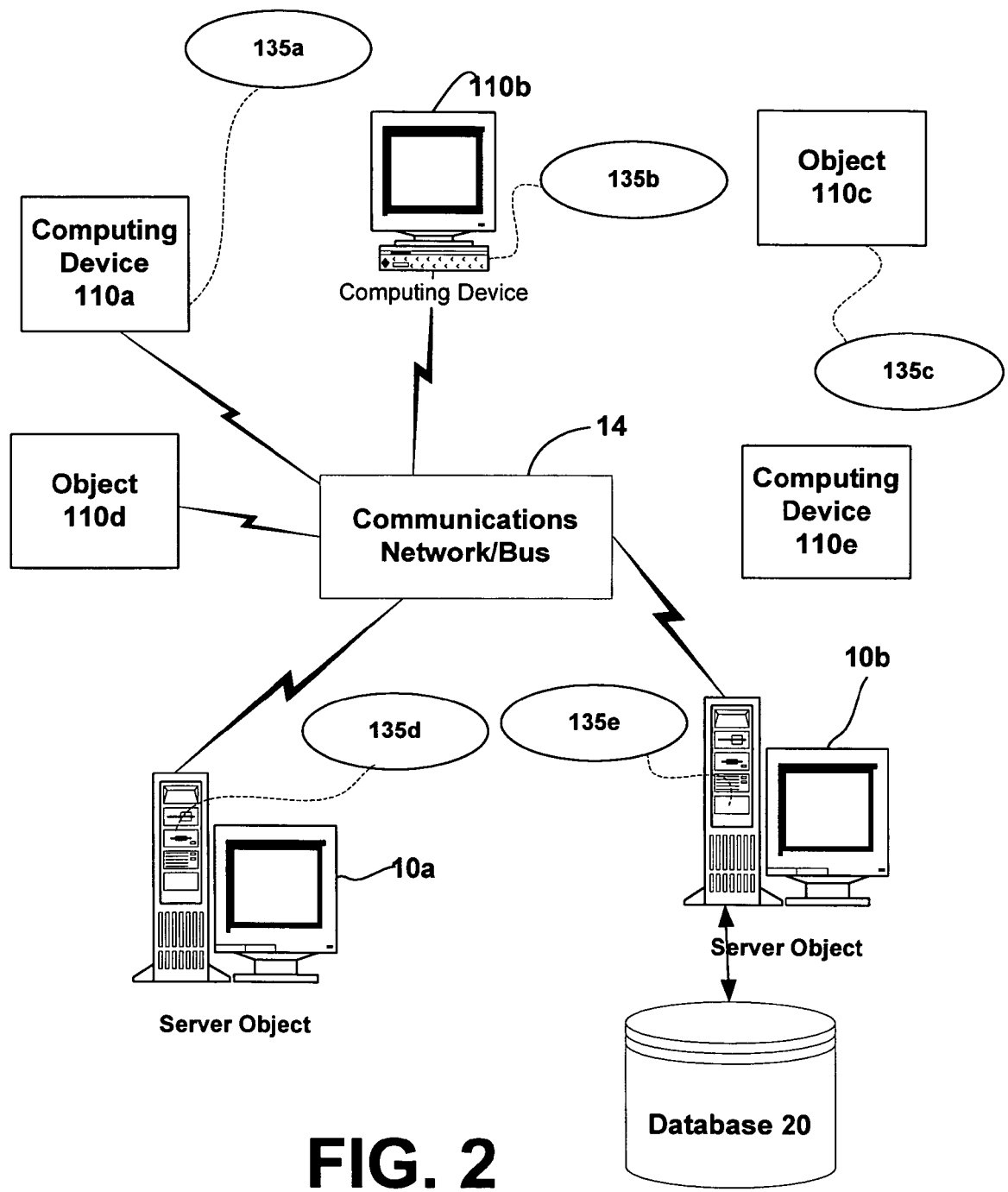
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
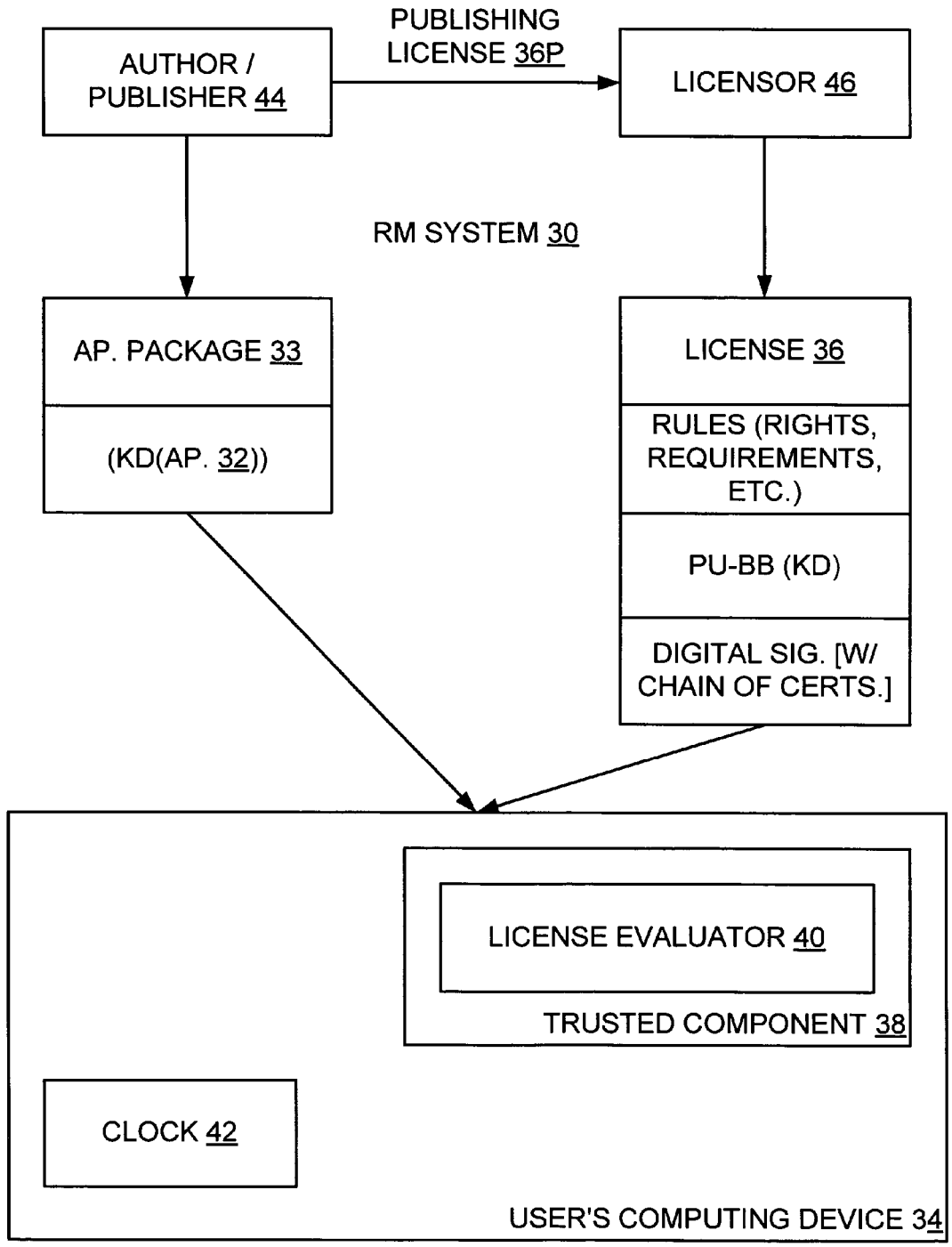
FIG. 3 is a block diagram showing an enforcement architecture of an example of a trust-based system, including a digital license in accordance with one embodiment of the present invention.

As is known, and referring now to FIG. 3, rights management (RM) and enforcement is highly desirable in connection with a digital application 32 or other content 32 that is to be distributed to users. Upon being received by the user, such user instantiates the application 32 with the aid of an appropriate computing device 34 or the like.

Typically, an application author or publisher (hereinafter 'publisher') 44 distributing such digital application 32 wishes to restrict what the user can do with such distributed application 32. For example, the publisher 44 may wish to restrict the user from copying and re-distributing such application 32 to a second user, or may wish to allow distributed application 32 to be actuated only a limited number of times, only for a certain total time, only on a certain type of machine, only on a certain type of rendering platform, only by a certain type of user, etc.

However, after distribution has occurred, such publisher 44 has very little if any control over the application 32. An RM system 30, then, allows the controlled actuating of an application 32, where such control is flexible and definable by the publisher 44 of such application 32. Typically, the application 32 is distributed to the user in the form of a package 33 by way of any appropriate distribution channel. The package 33 as distributed may include the application 32 or a portion thereof encrypted with a symmetric encryption/decryption key (KD), (i.e., (KD(AP))), as well as other information identifying the application 32, how to acquire a license for such application 32, etc.

The trust-based RM system 30 allows the publisher 44 of the application 32 or another to specify rules that must be satisfied before such application 32 is allowed to be actuated on a user's computing device 34. Such license rules can for example include the aforementioned temporal requirement and/or number of times requirement among other things, and may also set forth rights that the user has with regard to the application 32, such as for example the ability to print or copy and/or the ability to use a particular feature of the application 32, among other things. At any rate, such rules may be embodied within a digital license or use document (hereinafter 'license') 36 that the user/user's computing device 34 (such terms being interchangeable unless circumstances require otherwise) must obtain from the publisher 44 or an agent thereof. Such license 36 also includes the decryption key (KD) for decrypting the encrypted portion of the application 32, perhaps encrypted according to a key decryptable by the user's computing device 34. As seen in FIG. 3, such encrypting key may be a public key of the user's computing device 34 (PU-BB), and the user's computing device 34 presumably has the corresponding private key (PR-BB) by which (PU-BB (KD)) may be decrypted.

The publisher 44 for the application 32 must trust that the user's computing device 34 will abide by the rules specified by such publisher 44 in the license 36, i.e. that the application 32 will not be actuated unless the rules within the license 36 are satisfied, and that the user is only permitted to employ the rights set forth in the rules. Preferably, then, the user's computing device 34 is provided with a trusted component or mechanism 38 that will not actuate the application 32 except according to the license rules embodied in the license 36 associated with the application 32 and obtained by the user.

The trusted component 38 typically has a license evaluator 40 that determines whether the license 36 is valid, reviews the license rules in such valid license 36, and determines based on the reviewed license rules whether the requesting user has the right to actuate the corresponding application 32 in the manner sought, among other things. As should be understood, the license evaluator 40 is trusted in the RM system 30 to carry out the wishes of the publisher 44 of the application 32 according to the rules in the license 36, and the user should not be able to easily alter such trusted element for any purpose, nefarious or otherwise.

As should be understood, the rules in the license 36 can specify whether the user has rights to actuate the application 32 based on any of several factors, including who the user is, where the user is located, what type of computing device 34 the user is using, what operating system is calling the RM system 30, the date, the time, etc. In addition, the rules of the license 36 may limit the license 36 to a pre-determined number of actuations, or pre-determined operating time, for example. Thus, the trusted component 38 may need to refer to a clock 42 on the computing device 34.

The rules may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules therein, the application 32 or a relevant portion thereof can then be actuated. In particular, to actuate the application 32, the decryption key (KD) is obtained from the license 36 and is applied to (KD(AP)) from the package 33 to result in the actual application 32, and the actual application 32 is then in fact actuated in the manner set forth in the license 36.

As set forth above, the license 36 with (PU-BB(KD)) in effect authorizes an entity in possession of (PR-BB) to access (KD) and thereby access the application 32 encrypted according to such (KD), presuming of course that the entity abides by all conditions as set forth in the license 36. As should be appreciated, though, other types of licenses 36 may exists within the RM system 30.

For example, it may be appreciated that in one scenario the publisher 44 of the application 32 may authorize one or more particular licensors 46 to issue a license 36 for the application 32 by providing the licensor 46 with a publishing license 36p. As may be appreciated, such publishing license 36p is similar to the license 36 in that such publishing license 36p likely includes the decryption key (KD) for decrypting the application 32, here encrypted according to a public key of the licensor 46 (PU-BB). Likewise, the publishing license 36p likely includes the rules for rendering the content 32. Here, however, such rules are to be inserted into the license 36 as issued by the licensor 46, and are not especially applicable to such licensor 46.

Note, though, that the publishing license 36p may indeed include other rules that are indeed applicable to the licensor 46. Accordingly, the licensor 46 should include a trusted component 38 with a license evaluator 40 in a manner akin to the user's computing device 34. Significantly, each type of license 36, 36p, etc. (hereinafter, 'license 36') as proffered typically includes a digital signature for authentication/verification purposes, and each digital signature is validated by the trusted component 38 before the license 36 is honored. Of course, if any validation fails, the process ends and the license 36 is not honored.

Aggregating Rights in Separate Types of Licenses 36

As was set forth above, a publisher 44 may wish to provide a user with the flexibility to separately purchase different sets of rights with regard to a particular application 32 or the like, whereby the user would accumulate and aggregate the different sets of rights as needed to operate the application in the manner sought. For example, the publisher 44 may wish to provide the right to print in a first type of license 36 separately from the right to copy in a second type of license 36, and likewise may wish to provide both the right to play sound on a speaker and video on a monitor in a third type of license 36, and further likewise may wish to provide a minimal set of rights in a fourth type of license 36. Thus, the user to operate the application 32 in a minimal manner would obtain the fourth type of license 36, and if need be would obtain and 'add on' any or all of the first, second, and third types of licenses as the corresponding rights are needed or desired.

As should be appreciated, then, and in the present invention, the application 32 is operated according to rights set forth in one or more licenses 36 at any one time, where the rights and other rules in the licenses 36 are in effect aggregated to form a super-set of rules and rights with regard to the application 32. Such aggregated super-set of rules and rights is to be distinguished from the prior art, where the application 32 was operated based on one and only one license 36 at any one time.

As a more concrete example, consider an instance where an application 32 is installed on a computing device 34 to include a basic start-up or 'base' license 36 that provides a user of the application 32 at the computing device 34 with basic rights such as for example the right to instantiate the application 32, the right to operate the basic functions of the application 32, and the right to print from the application 32, but not other rights, such as for example the right to copy data from the application 32 elsewhere. In addition, the base license 36 may be intended to give the user a preview of the application 32 without purchasing same, but only for a period of fifteen days. In such a case, the license 36 may at least conceptually appear as:

```
<Base license>
    ...
    <rights>
        <instantiate>yes</instantiate>
            <conditions>
                ...
            </conditions>
        <basic functions>yes</basic functions>
            <conditions>
                ...
            </conditions>
        <print>yes</print>
```

-continued

```
            <conditions>
                ...
            </conditions>
    <rights>
        ...
    <expiration date>
        <days after first use>15</days after first use>
    </expiration date>
        ...
    <hierarchy>
        <family id>base</family id>
        <parent>[null]</parent>
    </hierarchy>
        ...
</Base license>
```

Note that the above base license 36 sets forth rights in a positive manner only and thus does not set forth rights that have not been provided, such as the right to copy data. However, such rights could instead be set forth both in a positive and negative manner without departing from the spirit and scope of the present invention.

More importantly, it is to be noted that in addition to the rights information and the expiration date information, the above base license 36 sets forth hierarchy information, including a family id attribute set to 'base' and a parent attribute set to null. In one embodiment of the present invention, such family and base attributes are employed to define the place of the above base license 36 within a hierarchy of licenses 36 that collectively may in effect be combined so as to aggregate the rules therein. In particular, the family id attribute 'base' is employed to identify the above base license 36 as 'base', and the null parent attribute shows that 'base' has no parent and therefore is a base license 36.

With the above base license 36, then, and as an example, if at some point after the fifteen day preview of the application 32 the user wishes to obtain the right to use the application 32 for a year, such user may obtain an appropriate license 36 containing such right as an addition to the base license 36, where the rights set forth in such 'add-on' license 36 are in effect to be added on to the rights set forth in the base license 36:

```
<Add-on A license>
    ...
    <rights>
        [null]
    <rights>
        ...
    <expiration date>
        <days after first use>365</days after first use>
    </expiration date>
        ...
    <hierarchy>
        <family id>Add-on A</family id>
        <parent>base</parent>
    </hierarchy>
        ...
</Add-on A license>
```

Note that the above add-on A license 36 sets forth no additional rights, but instead only sets forth that the expiration date of the application 32 is now 365 days or one year after first use of such add-on A license 36. Note, too, that the Add-on A license 36 sets forth hierarchy information including a family id attribute set to 'Add-on A' and a parent attribute set to base. Thus, the family id attribute 'add-on A' is employed to identify the add-on A license 36 as 'add-on A', and the parent attribute 'base' shows that the base license 36 identified as 'base' is the parent of the add-on A license 36.

In a similar manner, if at some point the user wishes to obtain the aforementioned right to copy, such user may obtain another appropriate license 36 containing such right as an addition to the base license 36, where the rights set forth in such 'add-on' license 36 are in effect to be added on to the rights set forth in the base license 36:

```
<Add-on B license>
    ...
    <rights>
        <copy>yes</copy>
        <conditions>
            ...
        </conditions>
    <rights>
    ...
    <expiration date>
        [null]
    </expiration date>
    ...
    <hierarchy>
        <family id>Add-on B</family id>
        <parent>base</parent>
    </hierarchy>
    ...
</Add-on B license>
```

Note that the above add-on B license 36 sets forth only the right to copy without any change to the expiration date. Note, too, that the Add-on B license 36 sets forth hierarchy information including a family id attribute set to 'Add-on B' and a parent attribute set to base. Thus, the family id attribute 'add-on B' is employed to identify the add-on B license 36 as 'add-on B', and the parent attribute 'base' shows that the base license 36 identified as 'base' is the parent of the add-on B license 36.

Also in a similar manner, if at some point the user wishes to obtain the right to use the application 32 for ten years, such user may obtain an appropriate license 36 containing such right as an addition to the add-on A license 36, where the rights set forth in such 'add-on' license 36 are in effect to be added on to the rights set forth in the base license 36 and the add-on A license 36:

```
<Add-on C license>
    ...
    <rights>
        [null]
    <rights>
    ...
    <expiration date>
        <years after first use>10</years after first use>
    </expiration date>
    ...
    <hierarchy>
        <family id>[null]</family id>
        <parent>Add-on A</parent>
    </hierarchy>
    ...
</Add-on C license>
```

Note that the above add-on C license 36 sets forth no additional rights, but instead only sets forth that the expiration date of the application 32 is now ten years after first use of such add-on C license 36. Note, too, that the Add-on A license 36 sets forth hierarchy information includes a null family id attribute and a parent attribute set to add-on A. Thus, the null family id attribute prevents the Add-on C license 36 from being identified within the hierarchy, with the result being that no other license 36 can employ same as a parent, and the parent attribute 'add-on A' shows that the base license 36 identified as 'base' is the parent of the Add-on C license 36.

Figure 4:
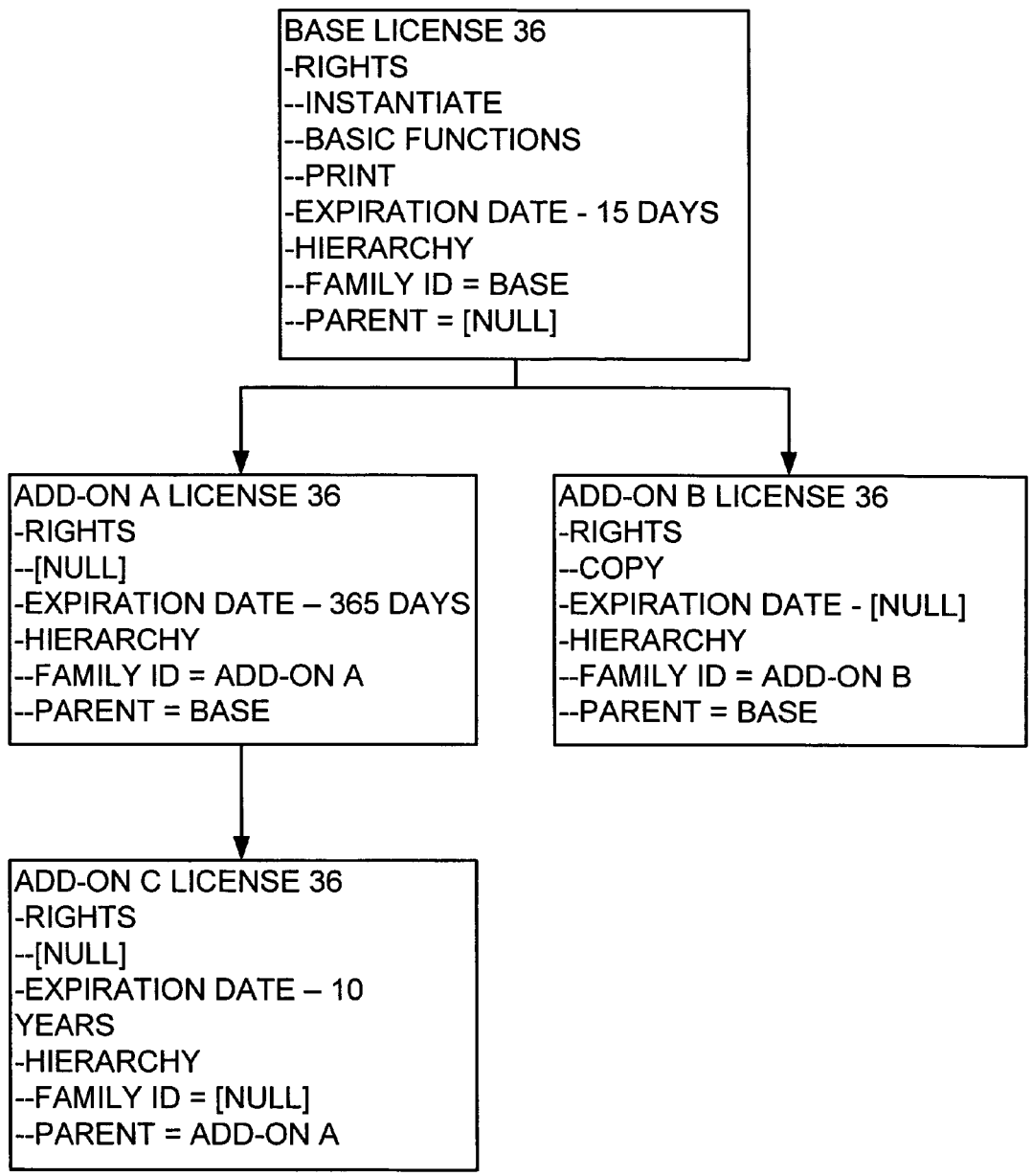
FIG. 4 is a block diagram showing a hierarchy of licenses such as the license of FIG. 3, where the hierarchy includes a base license and add-on licenses in accordance with one embodiment of the present invention.

As may be appreciated, based on the hierarchy information in all the above licenses 36, a tree representing the overall hierarchy of such licenses 36 may be developed, as is shown in FIG. 4. Such tree and the hierarchy represented thereby provide at least two features. Firstly, each license 36 within the hierarchy can only be employed if such license 36 is present and if the parentage of such license 36 is present, all the way back to the base license 36. Thus, and as an example, if the user obtained the base license 36 and the Add-on C license 36 but not the Add-on A license 36, such Add-on C license 36 would be inoperative as not being linked to the base license 36 by way of the Add-on A license 36.

Secondly, the positions of the licenses 36 within the hierarchy may be employed to negotiate conflicts between rules and rights in such licenses 36. For example, it may be the case that one license 36 within the hierarchy specifically provides a particular right while another license 36 within the hierarchy specifically denies the particular right. In such a case, the conflict between the licenses 36 might be resolved according to pre-determined conflict rules that could at least in part depend on the respective positions of the licenses 36 within the hierarchy. For example, such rules may state that a child license 36 supersedes a parent license 36, or that a younger sibling license 36 supersedes an older sibling license 36. As may be appreciated, such conflict rules may be any appropriate conflict rules without departing from the spirit and scope of the present invention. Such conflict rules are generally known to the relevant public and therefore need not be set forth herein in any detail.

As may now be appreciated, by using base licenses 36 and add-on licenses 36 in the manner set forth above, a publisher 44 or licensor 46 or the like can modify rules and rights therein granted by a specific base license 36 with additional or altered rules and rights therein in one or more add-on licenses 36. Note here that such a modification can include revoking, restricting, removing, deleting, and otherwise affecting rights, in addition to adding and otherwise changing existing rights. With an add-on license 36, then, new functionality for an application 32 or other piece of content 32 can be distributed/sold/provided separately, at a later time, without the considerable time and expense of having to re-distribute the application 32 or a license 36 therefore.

Generally, an add-on license 36 can modify any rule of any previous generation (parent, grandparent, etc.) license 36, including any rights and conditions set forth therein, without departing from the spirit and scope of the present invention. For example, it may be the case that a base license 36 grants rights that are relatively basic for only a minimal cost, and for a relatively short period of time of use, and allows only a limited amount of memory on the computing device 34 to be used. In such case, one or more available add-on licenses 36 for the base license 36 may extend the rights granted to a relatively broader scope, one or more available add-on licenses 36 for the base license 36 may extend the period of time of use, and one or more available add-on licenses 36 for the base license 36 may extend the amount of memory to be used. Of course, other add-on licenses 36 could offer combinations of such rights.

Note that within any hierarchy of licenses 36 such as that shown in FIG. 4, more than one base license 36 potentially may be available. Correspondingly, it may be the case that an add-on license 36 specifies more than one parent. In such a situation, it may be the case that only one base license 36 of the hierarchy and add-on licenses 36 thereof are selected for use in connection with an application 32. Alternatively, it may be the case that more than one or all of the base licenses 36 of the hierarchy and add-on licenses 36 thereof are selected for use in connection with an application 32.

Note, too, that an add-on license 36 may effectuate rights in an application 32 that are secured by a decryption key (KD) contained within such add-on license 36, or may effectuate rights in an application 32 that are secured by a decryption key (KD) contained within a previous generation license 36 of such add-on license 36. Especially, in the latter case, it is to be appreciated that the potential exists for a nefarious entity to insert a 'rogue' add-on license 36 of its own design into a hierarchy of licenses 36, where the rogue add-on license 36 would be employed to expand rights set forth in such a previous generation license 36.

Accordingly, in one embodiment of the present invention, each license 36 in the hierarchy is digitally signed according to a public key that leads back to a root authority that such a nefarious entity would not normally have access to. Thus, the nefarious entity should not be able to obtain a digital certificate with a chain of certificates extending from such root authority and could not sign a rogue add-on license 36 based on such a digital certificate. Correspondingly, one step in validating each license 36 in a hierarchy such as that shown in FIG. 4 would be to verify that the signature of such license 36 validates based on a chain of certificates extending from such root authority.

In one embodiment of the present invention, each license 36 in the hierarchy is digitally signed according to a public key that leads back to a single root authority, and in fact each such license 36 as issued has a corresponding public-private key pair. In such embodiment, then, the private key of a parent license 36 is employed to digitally sign each child license 36 thereof, and the digital signature of each such child license 36 is thus validated according to the public key of the parent license 36 thereof. Accordingly, such public key should be included within such parent license 36. Correspondingly, validating each license 36 in a hierarchy such as that shown in FIG. 4 includes obtaining the public key of the parent license 36 for such license 36, and employing the obtained public key to validate the digital signature of such license 36.

Figure 5:
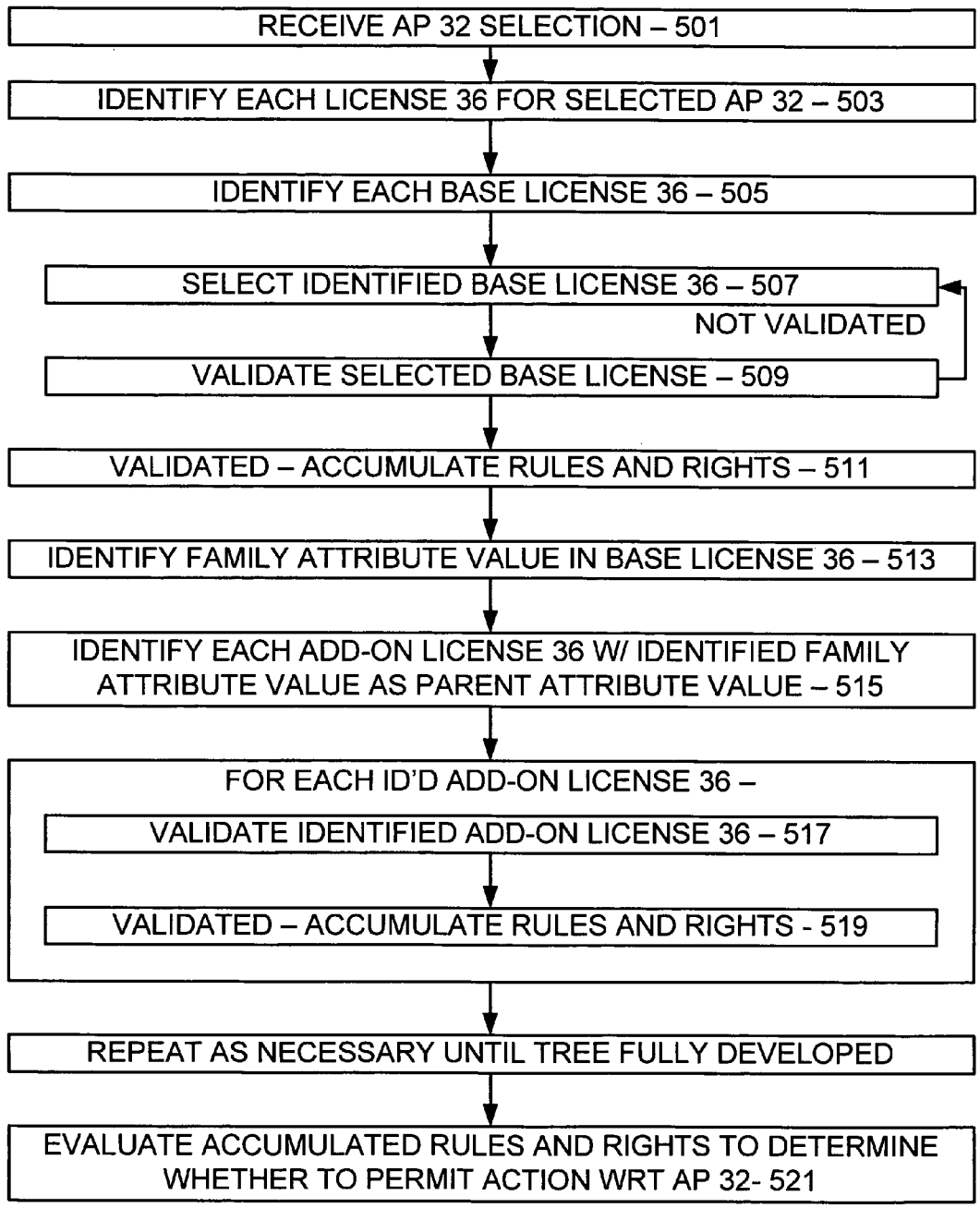
FIG. 5 is a flow diagram showing key steps performed in aggregating rules set forth in each of the licenses of the hierarchy of FIG. 4 in accordance with one embodiment of the present invention.

Turning now to FIG. 5, one possible method for employing a base license 36 and add-on licenses 36 extending therefrom such as from the hierarchy of FIG. 4 is shown in accordance with one embodiment of the present invention. Preliminarily, such a method is imitated at a computing device 34 by receiving a selection of an application 32 or the like to be instantiated or otherwise rendered or employed on such computing device 34 (step 501). The computing device 34 would note that the application 32 or the like is RM-protected, and thus would employ the trusted component 38 of FIG. 3 or the like to obtain approval and assistance to in fact actuate the selected application 32.

Thus, based on the selected application 32, the trusted component 38 would identify from an associated license store or the like (not shown) each license 36 therein that corresponds to such selected application 32 (step 503), where the identified licenses 36 presumably include at least one base license 36 and one or more add-on licenses 36. Note that such identification may be performed in any appropriate manner without departing from the spirit and scope of the present invention. For example, it may be that the application 32 is tagged with a particular reference ID and each corresponding license 36 also contains such reference ID.

At any rate, with all of the identified licenses 36, the trusted component 38 then assembles a tree such as that of FIG. 4 to establish hierarchical relationships between the identified licenses 36. In particular, the trusted component 38 identifies each base license 36 from among the identified licenses 36 (step 505), selects one of the identified base licenses 36 (step 507), and then validates the selected base license (step 509). As may be appreciated, selecting the base license 36 from among a plurality of such base license 36 as at step 507 may be performed in any appropriate manner without departing from the spirit and scope of the present invention. For example, the selection may be based on some order of the identified base licenses 36, such as for example based on an issuance data included therein, a license ID included therein, a priority value included therein, etc. Similarly, validating the selected base license 36 as at step 509 may also be performed in any appropriate manner without departing from the spirit and scope of the present invention. For example, such validation may include a check that the digital signature thereof validates, that the license 36 has not expired, and that any conditions for using the license 36 are satisfied.

If the selected base license 36 does not validate as at step 509, control returns to step 507 where another identified base license 36 is selected. However, presuming the selected base license 36 does indeed validate as at step 509, the rules and rights therein set forth in the selected base license 36 are accumulated into a representation of an aggregate license 36 (step 511). As may be appreciated, such representation will contain the rules and rights from all licenses 36 found to be in the assembled hierarchical tree.

Thereafter, the method continues by identifying within the validated base license 36 the value of the family attribute, if any (step 513). Based on the identified family attribute value, then, the trusted component 38 identifies each add-on license 36 that corresponds to the selected application 32 and that has the identified family attribute value as the parent attribute value (step 515). As may be appreciated, each such identified add-on license is validated as at step 509 (step 517), and presuming the validation succeeds, the rules and rights therein set forth in the add-on license 36 are accumulated into the representation of the aggregate license 36 (step 519). As was alluded to above, in the course of so accumulating, conflicts between rules and rights in multiple ones of the licenses 36 are negotiated according to pre-determined conflict rules that may at least in part depend on the respective positions of the licenses 36 within the hierarchy.

As should now be appreciated, the method repeats with regard to each validated add-on license as necessary. In particular, for each such validated add-on license, the method continues by identifying within the validated add-on license 36 the value of the family attribute, if any, as at step 513. Based on the identified family attribute value, then, and again, the trusted component 38 identifies each add-on license 36 that corresponds to the selected application 32 and that has the identified family attribute value as the parent attribute value as at step 515, validates each such identified add-on license as at steps 509 and 517, and presuming the validation succeeds, the rules and rights therein set forth in the add-on license 36 are accumulated into the representation of the aggregate license 36 as at step 519. Thus, and as should be appreciated, the method iterates for each validated add-on license 36 as many times as may be necessary and for as many levels of the hierarchical tree as may be necessary until the hierarchical tree is fully developed and the representation of the aggregate license 36 is fully developed. Once fully developed, then, the representation of the aggregate license 36 is evaluated by the license evaluator 40 to determine whether each action sought in connection with the application 32 is to be permitted (step 521).

Note that in the course of developing a hierarchical tree of licenses 36 according to the method of FIG. 5, if a parent license 36 fails to validate as at step 509 and 517, all child licenses 36 of such a parent license 36 and indeed all future generations of such a parent license 36 are not even considered. Thus, if a license A has a child license B and the child license B in turn has a child license C, the failure of A to validate in effect renders B and C as invalidated too. Likewise, if A validates but B does not validate, then the failure of B to validate in effect renders C as invalidated too, but A is still validated.

Note too that in one embodiment of the present invention a license 36 may specify more than one parent license 36. If so, it may be the case that one parent validates while the other does not, with the result being that the license 36 is reached by way of the validated parent and not by the invalidated parent. Likewise, it may be the case that all of the parent licenses may have to validate to reach the license 36, or that more complex logical rules can be employed. In the latter case, such logical rules can be set forth within the license 36 in an appropriate portion thereof. As an example of such a logical rule, a license might specify a combination of parent licenses that must validate as:

(License A or License B) and (License C and (License D or License E)), in which case appropriate parental candidate licenses must validate according to the logical expression for the license 36 at issue to be evaluated.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention,

It should be appreciated that changes could be made to the embodiments described above without departing from the inventive concepts thereof. Most notably, although the present invention is set forth in terms of licenses 36 for a digital application 32, such licenses 36 may also be employed in connection with any other form of digital content 32, including but not limited to audio content, video content, text content, streaming content, multimedia content, and the like. It should be understood, therefore, that this invention is not limited to the particular embodiments disclosed, but it is intended to cover modifications within the spirit and scope of the present invention as defined by the appended claims.

The invention claimed is:

1. A method of employing a piece of digital content on a user's computer in a particular manner, the method comprising:

the user's computer obtaining a base license corresponding to the content, the base license comprising a first family id attribute, a first parent attribute, and a first set of rules specifying how the content may be employed;

the user's computer determining that the first set of rules allows employing the content;

the user's computer employing the content according to the first set of rules;

the user's computer obtaining a first add-on license, the first add-on license comprising a second family id attribute, a second parent attribute, and a second set of rules specifying how the content may be employed;

the user's computer determining that the first family id attribute and the second parent attribute are the same value;

the user's computer aggregating the first set of rules and the second set of rules into a first aggregated set of rules;

the user's computer determining that the first aggregated set of rules allows employing the content;

the user's computer employing the content according to the first aggregated set of rules;

the user's computer obtaining a second add-on license comprising a third family id attribute, a third parent attribute, and a third set of rules specifying how the content may be employed;

the user's computer determining that the second family id attribute and the third parent attribute have the same value;

the user's computer aggregating the third set of rules and the first aggregated set of rules into a second aggregated set of rules;

the user's computer determining that the second aggregated set of rules allows employing the content; and the user's computer employing the content according to the second aggregated set of rules.

2. The method of claim 1 wherein the first family id attribute identifies the base license within a hierarchy of the licenses and the second parent attribute of the first add-on license identifies the base license as the hierarchical parent thereof, the method comprising identifying additional add-on licenses by way of determining a value of the first family id attribute and locating each additional add-on license having a parent attribute thereof set to the value of the first family id attribute of the base license.

3. The method of claim 1 further comprising the user's computer identifying the base license by determining that the first parent attribute is set to a null value.

4. The method of claim 1 wherein the user's computer determining that the first aggregated set of rules allows employing the content includes employing pre-determined conflict rules to negotiate any conflicts between rules from conflicting licenses, the conflict rules resolving each conflict at least in part based on respective positions of the conflicting licenses within a hierarchy of the licenses.

5. The method of claim 1 wherein the content is encrypted and decryptable according to a decryption key (KD) contained within at least one of the base license and the first add-on license, the method comprising the user's computer employing the content by retrieving (KD) from a license containing same and decrypting the content with (KD).

6. The method of claim 1 wherein each of the base license and the first add-on license includes a digital signature produced according to a public key that leads back to a common root authority, the method further comprising the user's computer verifying that the signature of each of the base license and the first add-on license validates based on a chain of certificates extending from such common root authority.

7. The method of claim 1 wherein the third family id attribute has a value of null indicating that no other add-on license can be added on to the second add-on license.

8. The method of claim 1 wherein the user's computer evaluating the second aggregated set of rules to determine that the second aggregated set of rules allows employing the content includes employing pre-determined conflict rules to negotiate any conflicts between rules from conflicting licenses, the conflict rules resolving each conflict at least in part based on respective positions of the conflicting licenses within a hierarchy of the licenses.

9. A computer-readable storage medium having stored therein computer-executable instructions that when executed by a processor implement a method of employing a piece of digital content on a user's computing device in a particular manner, the method comprising:

obtaining a base license on the user's computing device comprising a first family id attribute, a first parent attribute, and a first set of rules specifying how the content may be employed;

determining that the first set of rules allows employing the content;

employing the content according to the first set of rules;

obtaining a first add-on license on the user's computing device comprising a second family id attribute, a second parent attribute, and a second set of rules specifying how the content may be employed;

determining that the first family id attribute and the second parent attribute are the same value;

aggregating the first set of rules and the second set of rules into a first aggregated set of rules;

determining that the first aggregated set of rules allows employing the content;

employing the content on the user's computing device according to the first aggregated set of rules;

obtaining a second add-on license on the user's computing device comprising a third family id attribute, a third parent attribute, and a third set of rules specifying how the content may be employed;

determining that the second family id attribute and the third parent attribute are the same value;

aggregating the third set of rules and the first aggregated set of rules into a second aggregated set of rules;

determining that the second aggregated set of rules allows employing the content; and employing the content on the user's computing device according to the second aggregated set of rules.

10. The medium of claim 9 wherein the first family id attribute identifies the base license within a hierarchy of the licenses and the second parent attribute of the first add-on license identifies the base license as the hierarchical parent thereof, the method comprising identifying additional add-on licenses by way of determining a value of the first family id attribute and locating each additional add-on license having a parent attribute thereof set to the value of the first family id attribute of the base license.

11. The medium of claim 9 further comprising identifying the base license by determining that the first parent attribute is set to a null value.

12. The medium of claim 9 wherein evaluating the first aggregated set of rules to determine that the first aggregated set of rules allows employing the content includes employing pre-determined conflict rules to negotiate any conflicts between rules from conflicting licenses, the conflict rules resolving each conflict at least in part based on respective positions of the conflicting licenses within a hierarchy of the licenses.

13. The medium of claim 9 wherein the content is encrypted and decryptable according to a decryption key (KD) contained within at least one of the base license and the first add-on license, the method comprising employing the content by retrieving (KD) from a license containing same and decrypting the content with (KD).

14. The medium of claim 9 wherein each of the base license and the first add-on license includes a digital signature produced according to a public key that leads back to a common root authority, the method further comprising verifying that the signature of each of the base license and the first add-on license validates based on a chain of certificates extending from such common root authority.

15. The medium of 9 wherein the third family id attribute has a value of null indicating that no other add-on license can be added on to the second add-on license.

16. The medium of claim 9 wherein evaluating the second aggregated set of rules to determine that the second aggregated set of rules allows employing the content includes employing pre-determined conflict rules to negotiate any conflicts between rules from conflicting licenses, the conflict rules resolving each conflict at least in part based on respective positions of the conflicting licenses within a hierarchy of the licenses.

* * * * *